(12) United States Patent
Hayashi et al.

(10) Patent No.: US 6,226,987 B1
(45) Date of Patent: May 8, 2001

(54) TRAVEL DRIVE APPARATUS FOR HYDRAULIC DRIVE WORK VEHICLES AND CONTROL THEREFOR

(75) Inventors: Seita Hayashi; Hideki Kado; Sadao Nunotani, all of Oyama (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/218,493

(22) Filed: Dec. 22, 1998

(30) Foreign Application Priority Data

Dec. 24, 1997 (JP) .................................................. 9-366404

(51) Int. Cl.[7] .................................................. F16D 31/02
(52) U.S. Cl. .................................................. 60/447; 60/452
(58) Field of Search .................................. 60/445, 447, 449, 60/450, 451, 452, 487

(56) References Cited

U.S. PATENT DOCUMENTS

| | | | |
|---|---|---|---|
| 3,429,123 | * | 2/1969 | Burroughs ............................. 60/450 |
| 3,543,508 | * | 12/1970 | Schwab ................................. 60/449 |
| 4,216,656 | * | 8/1980 | Hamma ............................... 60/447 X |
| 4,359,130 | * | 11/1982 | Kirkham ............................. 60/447 X |
| 4,481,769 | * | 11/1984 | Nagahara ........................... 60/451 X |
| 4,531,367 | * | 7/1985 | Backe et al. .......................... 60/447 |
| 4,545,201 | * | 10/1985 | Backe et al. ...................... 60/447 X |
| 4,559,778 | * | 12/1985 | Krusche ................................ 60/447 |
| 4,810,171 | * | 3/1989 | Krebs ................................. 60/447 X |
| 5,101,628 | * | 4/1992 | Yoshino ............................. 60/452 X |
| 5,177,964 | * | 1/1993 | Tanaka et al. ...................... 60/452 X |
| 5,197,283 | * | 3/1993 | Kagiwada et al. ................. 60/451 X |
| 5,634,335 | * | 6/1997 | Schniederjan ...................... 60/451 X |
| 5,709,282 | * | 1/1998 | Akira et al. ........................ 60/445 X |

FOREIGN PATENT DOCUMENTS

| | | | |
|---|---|---|---|
| 52-72073 | * | 6/1977 | (JP) ..................................... 60/452 |
| 57-134003 | * | 8/1982 | (JP) ..................................... 60/452 |
| 58-91959 | * | 6/1983 | (JP) ..................................... 60/452 |
| 4-285304 | * | 10/1992 | (JP) ..................................... 60/452 |
| 59-55931 | * | 3/1994 | (JP) ..................................... 60/452 |
| 6-159308 | * | 6/1994 | (JP) ..................................... 60/452 |

* cited by examiner

Primary Examiner—John E. Ryznic
(74) Attorney, Agent, or Firm—Greer, Burns & Crain, Ltd.

(57) ABSTRACT

A travel drive apparatus for a hydraulic drive work vehicle of simple configuration, capable of preventing occurrence of cavitation which is predicted when a work vehicle is decelerated, descends a slope, or is changed from forward travel to reverse travel or from reverse travel to forward travel, and a control method thereof.

The travel drive apparatus for a hydraulic drive work vehicle includes a travel variable delivery hydraulic pump driven by power from an engine, a hydraulic motor that receives oil discharged from the travel variable delivery hydraulic pump and moves the vehicle at or below a prescribed speed, a travel changeover valve that receives the discharged oil from the travel variable delivery hydraulic pump, supplies the discharged oil to the hydraulic motor and discharges return oil from the hydraulic motor to a tank, in which a horsepower control mechanism is provided that is linked to the travel variable delivery hydraulic pump, that is operated by receiving pressure for driving the hydraulic motor at one end thereof and a signal responsive to a turning speed of the engine at the other end thereof, and that outputs a command to discharge a certain quantity of oil so that the pressure for driving the hydraulic motor reaches or exceeds a prescribed value, when the engine turning speed is at or below a prescribed value and the hydraulic motor is driven conversely from the vehicle.

3 Claims, 4 Drawing Sheets

TRAVEL DRIVE APPARATUS FOR HYDRAULIC DRIVE WORK VEHICLES AND CONTROL THEREFOR

BACKGROUND OF THE INVENTION

1. Field of the Invention

This invention pertains to a travel drive apparatus for hydraulic drive work vehicles and a control method therefor, and more particularly to a travel drive apparatus for hydraulic drive work vehicles, and a control method therefor, designed for a hydraulic drive work vehicle that comprises a variable delivery hydraulic pump for traveling that is driven by an engine, which vehicle travels as a drive wheel or wheels are driven by a hydraulic motor that is acted on by hydraulic pressure from the hydraulic pump, which apparatus prevents cavitation from occurring.

2. Description of the Related Art

Variable delivery hydraulic pumps (hereinafter called hydraulic pumps) are conventionally used as pumps for generating oil under pressure for driving hydraulic shovels and other working machines or traveling equipment. These hydraulic pumps are equipped with horsepower control mechanisms (hereinafter called regulators) to prevent the engine that drives the pump from stalling. Such a regulator controls the flow rate Q in response to the discharge pressure P, so that equipment is run with roughly constant torque (P×Q=constant). When the discharge pressure P is low, the force generated by a piston (not shown in the drawings) is smaller than the force of an opposing spring, wherefore the piston does not move, so that the cylinder block of the pump is in the position of maximum tilt angle, and the pump discharge quantity is also at maximum. When the load acting on the pump, that is, either the load of the working machine or the load when traveling, increases, the piston moves to a position that balances the force of the spring, decreasing the cylinder block tilt angle, and control is effected so that torque becomes constant. As described above, the spring used in the regulator pushes the cylinder block in the direction of maximum tilt angle. Alternatively, in another known example, the spring used in the regulator pushes the cylinder block in the direction wherein the tilt angle is minimized. Thus, when the engine is started, the load driving the pump becomes small, making engine startup easy.

Also known are hydraulic drive apparatuses, which use hydraulic pumps and hydraulic motors, for enabling hydraulic shovels and other construction equipment to travel. Among these known hydraulic drive apparatuses are those wherein the hydraulic pumps and hydraulic motors are connected in a closed circuit, and those wherein the hydraulic pumps and hydraulic motors are connected in an open circuit with changeover valves inserted between the hydraulic pumps and hydraulic motors. An example of such an open circuit is disclosed in Utility Model Registration No. 2543146, in gazette. According to this model, as diagrammed in FIG. 4, this hydraulic circuit comprises a hydraulic pump 201 for driving various actuators in the work vehicle, compound control valves 202A and 202B that are a collection of control valves for controlling the supply of pressure oil from the hydraulic pump 201 to each of various actuators, and a travel hydraulic motor 204 that is drive-controlled by travel control valves 203a and 203b for the compound control valves 202A and 202B. To a main line 205 for the travel hydraulic motor 204 are connected crossover relief valves 206, counterbalance valves 207, and lower makeup valves 208. The lower makeup valves 208 and an oil tank 210 are connected by a makeup circuit 212, and an oil cooler 211 is provided in the return oil line of the compound control valve 202A. A center joint CJ is also provided for circulating oil between an upper revolving structure and a lower revolving structure.

As based on the present invention, furthermore, while one end of the makeup circuit 212A is connected to the main lines 205A and 205B via a lower makeup valve (second makeup valve) 208, the other end thereof is connected to a line 222 upstream of a cooler relief valve 221 via the makeup circuit 212B. The upstream line 222 is the return line for the compound control valves 202A and 202B. Also, upper main lines 205C and 205D between the center joint CJ and the travel control valves 203a and 203b built into the compound control valves 202A and 202B are connected to the makeup circuit 212B via an upper makeup valve (first makeup valve) 223, and makeup oil is replenished from various portions to the upper main lines 205C and 205D. A hydraulic pump 201D is a hydraulic steering pump, connected to a hydraulic steering cylinder 225 via a steering valve 224. The return oil from the steering valve 224 is connected to the upstream line 222 of the cooler relief valve 221 via the makeup circuit 212B. Thus makeup oil is introduced to the upper main lines 205C and 205D on the side of the upper revolving structure that connects the center joint CJ and the compound control valves 202A and 202B. Accordingly, if a large flow rate of makeup oil is introduced, a large flow rate of makeup oil will be conveyed all the way to the travel hydraulic motor 204 installed in a lower traveling body. Also, the return oil from the hydraulic steering pump 201D is merged into the makeup circuit 212, wherefore an adequate makeup flow rate can be secured. Accordingly, cavitation can be definitely prevented in the travel hydraulic motor 204. In addition, makeup oil is also replenished directly to a lower main line from the makeup circuit 212. The pressure of the makeup oil can be set by the cooler relief pressure, and it is stated that replenishment efficiency is improved.

With a hydraulic drive apparatus for effecting travel in a hydraulic shovel or other construction machine, however, there are problems. Namely, when decelerating, descending a slope, or changing either from forward travel to reverse travel or from reverse travel to forward travel, cavitation occurs which damages the hydraulic motor, and, when descending a slope, due to overrun, the vehicle ceases to be controllable. Therefore, when a closed circuit configuration is used, in order to prevent overruns, the inertial energy of the working vehicle (roughly 125% of the rated vehicle speed) must absorb the inertial energy generated by the reverse drive torque of the engine. Hence, in order to absorb this with the travel hydraulic pump and travel hydraulic motor, the capacity (discharge volume per revolution, in cc/rev) has to be made large. With the closed circuit configuration, moreover, oil is supplied from a charge pump on the intake side of the closed circuit so that cavitation does not occur, and the supply volume of this charge pump must also be made large. Thus, the charge pump drive force must become large, and the engine output horsepower must be increased. The engine will become large, and wasted energy will be developed when traveling normally. The maximum traveling speed is determined by the capacities of the hydraulic pump and hydraulic motor, wherefore, at the very least, it is necessary to use a hydraulic pump having large capacity from the outset. In a large working vehicle, a hydraulic pump having larger discharge volume will become necessary, and, together therewith, it will be necessary to increase the engine output horsepower, which is uneconomical.

Next, according to Utility Model Registration No. 2543146, in gazette, configured with an open circuit, makeup oil is replenished from the makeup valve when normally moving forward, moving in reverse, accelerating, or descending a slope, and cavitation is prevented. However, when changing from forward travel to reverse travel or from reverse travel to forward travel, cavitation develops, damaging the hydraulic motor, and rendering control of the vehicle impossible. Suppose, for example, that an operator moves travel control valves 203a and 203b from the forward position (A) past neutral to the reverse position (C), thereby changing the vehicle from forward travel to reverse travel. While moving forward, pressure oil passes through the upper main line 205A and reaches the intake 204A in the travel hydraulic motor 204, turning the travel hydraulic motor 204, and moving the vehicle forward. When reverse travel is changed to, the pressure oil, from the reverse position (C) of the travel control valves 203a and 203b, passes through the upper main circuit 205D, reaches the counterbalance valve 207, and switches the counterbalance valve 207 to the reverse position (C). The pressure oil from the hydraulic pump 201, from the counterbalance valve 207 in the reverse position (C), passes through the lower main circuit 205B, reaches the intake 204B in the travel hydraulic motor 204, and tries to turn the travel hydraulic motor 204 and make the vehicle move in reverse. At this time, the travel hydraulic motor 204 is still turning in the forward direction due to the inertial energy of the vehicle, and oil is being discharged from the intake 204B in the travel hydraulic motor 204. For this reason, the pressure oil from the hydraulic pump 201 and the oil from the travel hydraulic motor 204 are discharged to the lower main circuit 205B and put under high pressure, whereupon the crossover relief valve 206 is activated. With the oil from this crossover relief valve 206, makeup oil is replenished to the lower main circuit 205B via the upper makeup valve (first makeup valve) 223, and cavitation is prevented. At this time, however, the oil discharged from the hydraulic pump 201 is at high pressure, wherefore, in the conventional hydraulic circuit, a regulator is used to reduce the discharge quantity of the hydraulic pump, so makeup oil is not adequately replenished to the lower main circuit 205B, and cavitation occurs. When the inertial energy of the vehicle is large, the discharge quantity of the hydraulic pump will become smaller while the crossover relief valve 206 is operating, cavitation will occur, and the vehicle will not stop within the designated range, which is a problem.

In view of the problems set forth above, an object of the present invention is to provide a travel drive apparatus for hydraulic drive work vehicles, and a control method therefor, having a simple configuration, wherewith it is possible to prevent the cavitation that predictably occurs when the work vehicle decelerates, descends a slope, or is switched either from forward travel to reverse travel or from reverse travel to forward travel.

SUMMARY OF THE INVENTION

In order to realize the object stated above, a travel drive apparatus for a hydraulic drive work vehicle according to a first embodiment of the invention includes: a travel variable delivery hydraulic pump driven by power from an engine; a hydraulic motor that receives oil discharged from the travel variable delivery hydraulic pump and moves a vehicle at or below a prescribed speed; and a travel changeover valve that receives the discharged oil from the travel variable delivery hydraulic pump, supplies the discharged oil to the hydraulic motor and discharges return oil from the hydraulic motor to a tank, wherein the apparatus comprises a horsepower control mechanism that is linked to the travel variable delivery hydraulic pump and activated by receiving pressure for driving the hydraulic motor at one end thereof and by receiving a signal responsive to a turning speed of the engine at the other end thereof, and that outputs a command to discharge a quantity of oil so that the pressure for driving the hydraulic motor reaches or exceeds a prescribed value, when the engine turning speed is at or below a prescribed value and the hydraulic motor is driven conversely from the vehicle.

When the configuration described above is implemented, when the vehicle is decelerating, descending a slope, or changed either from forward travel to reverse travel or from reverse travel to forward travel, when the hydraulic motor is being driven conversely from the vehicle and engine turning speed is low, the horsepower control mechanism linked to the travel variable delivery hydraulic pump increases the discharge quantity of the travel variable delivery hydraulic pump. For this reason, the hydraulic motor drive pressure sent from the travel variable delivery hydraulic pump is maintained at or above a prescribed pressure, so that cavitation no longer occurs.

Thus the hydraulic motor is driven by drive pressure sent from the travel variable delivery hydraulic pump, the hydraulic motor is not damaged by cavitation, and the vehicle does not become uncontrollable due to cavitation.

In a second embodiment based on the first embodiment, the horsepower control mechanism comprises: a servo valve that is activated by receiving the pressure that drives the hydraulic motor at one end thereof and the signal responsive to the engine turning speed at the other end thereof; and a piston cylinder that receives the pressure for driving the hydraulic motor in one chamber thereof and, the pressure for driving the hydraulic motor that has passed the servo valve in other chamber thereof, that accommodates a spring, and that discharges the quantity of oil from the travel variable delivery hydraulic pump by a spring force so that the pressure for driving the hydraulic motor reaches or exceeds a prescribed value, when the engine turning speed is at or below the prescribed value and the hydraulic motor is driven conversely from the vehicle.

When the configuration described above is implemented, when the engine turning speed is below a prescribed value and the hydraulic motor is being driven conversely from the vehicle, the servo valve is activated, receiving signals for engine turning speed and for the pressure driving the hydraulic motor, so as to connect the chambers on either side of the piston cylinder. Therefore the piston cylinder is activated by the spring contained therein to increase the quantity of oil discharged from the travel variable delivery hydraulic pump.

Thus the quantity of oil discharged from the travel variable delivery hydraulic pump increases, and cavitation ceases to occur on the hydraulic motor drive side.

Also, the quantity of oil discharged from the variable delivery hydraulic pump can be increased by the spring accommodated in the piston cylinder, and the configuration can be simplified and made inexpensive. In addition, the mechanical operation insures definite operation, and no malfunctions will occur.

A control method for a travel drive apparatus for hydraulic drive work vehicles according to a third embodiment of the invention is, a control method for a travel drive apparatus for a hydraulic drive work vehicle including a travel variable delivery hydraulic pump driven by power from an engine; a hydraulic motor that receives oil discharged from the travel variable delivery hydraulic pump and moves a vehicle at or below a prescribed speed; and a travel changeover valve that receives the discharged oil from the travel variable delivery hydraulic pump, supplies the discharged oil to the hydraulic motor and discharges return oil from the hydraulic motor to a tank, wherein when an engine turning speed is at or below a prescribed value and the hydraulic motor is driven conversely from the vehicle, signals for the engine turning speed and a hydraulic motor drive pressure are received and a quantity of oil is discharged from the travel variable delivery hydraulic pump so that the pressure for driving the hydraulic motor reaches or exceeds a prescribed value.

If the method described above is implemented, when the hydraulic motor is being driven conversely from the vehicle, and the engine turning speed is low, the horsepower control mechanism linked to the travel variable delivery hydraulic pump increases the discharge quantity of the travel variable delivery hydraulic pump, wherefore, even when decelerating, descending a slope, or being changed either from forward travel to reverse travel or from reverse travel to forward travel, the same effects are realized as in the first embodiment in that cavitation ceases to occur on the drive side of the hydraulic motor.

DESCRIPTION OF THE PREFERRED EMBODIMENTS

Figure 1:
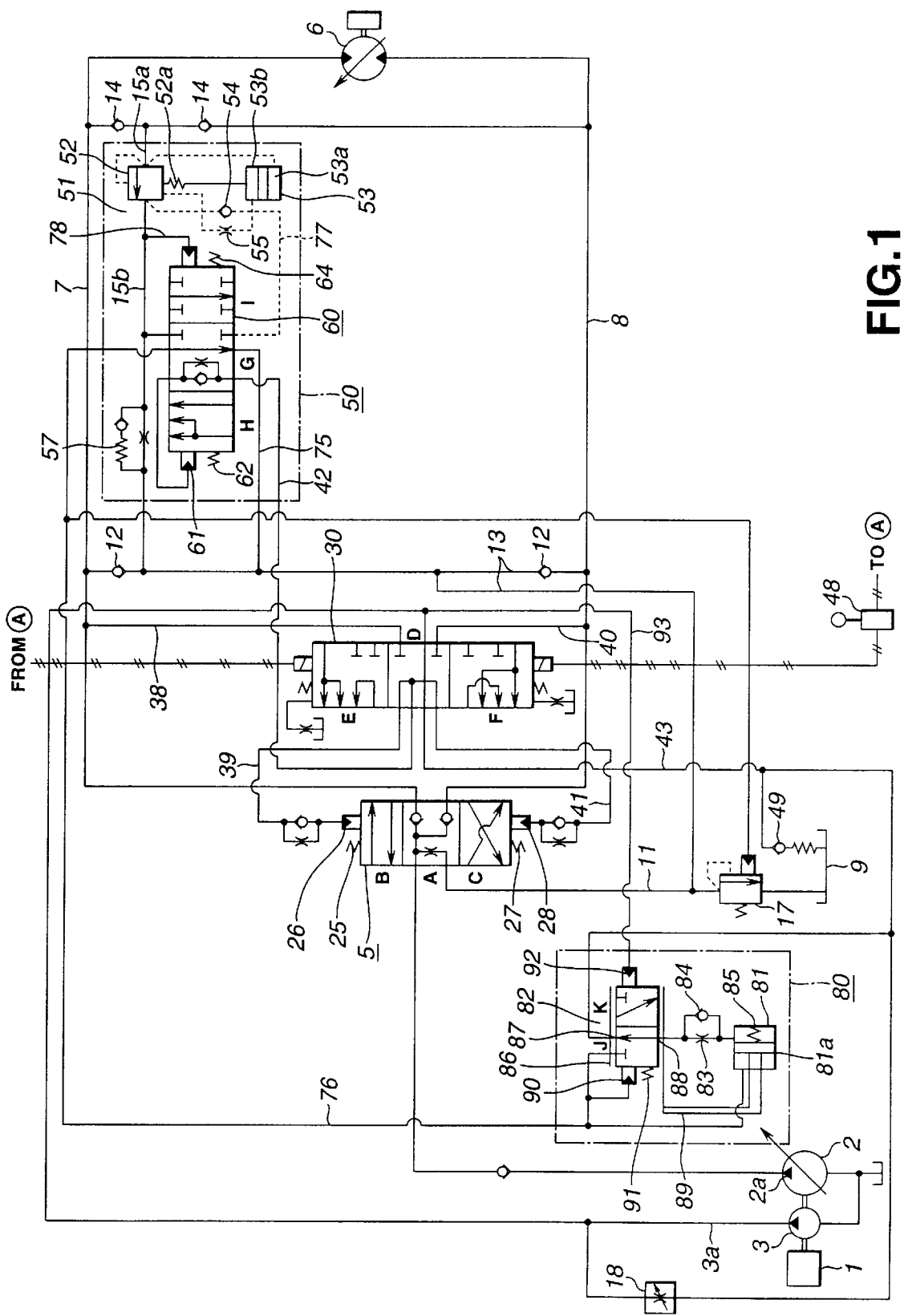
FIG. 1 is a hydraulic circuit diagram representing an embodiment of a travel drive apparatus for hydraulic drive work vehicles according to the present invention.
Figure 2:
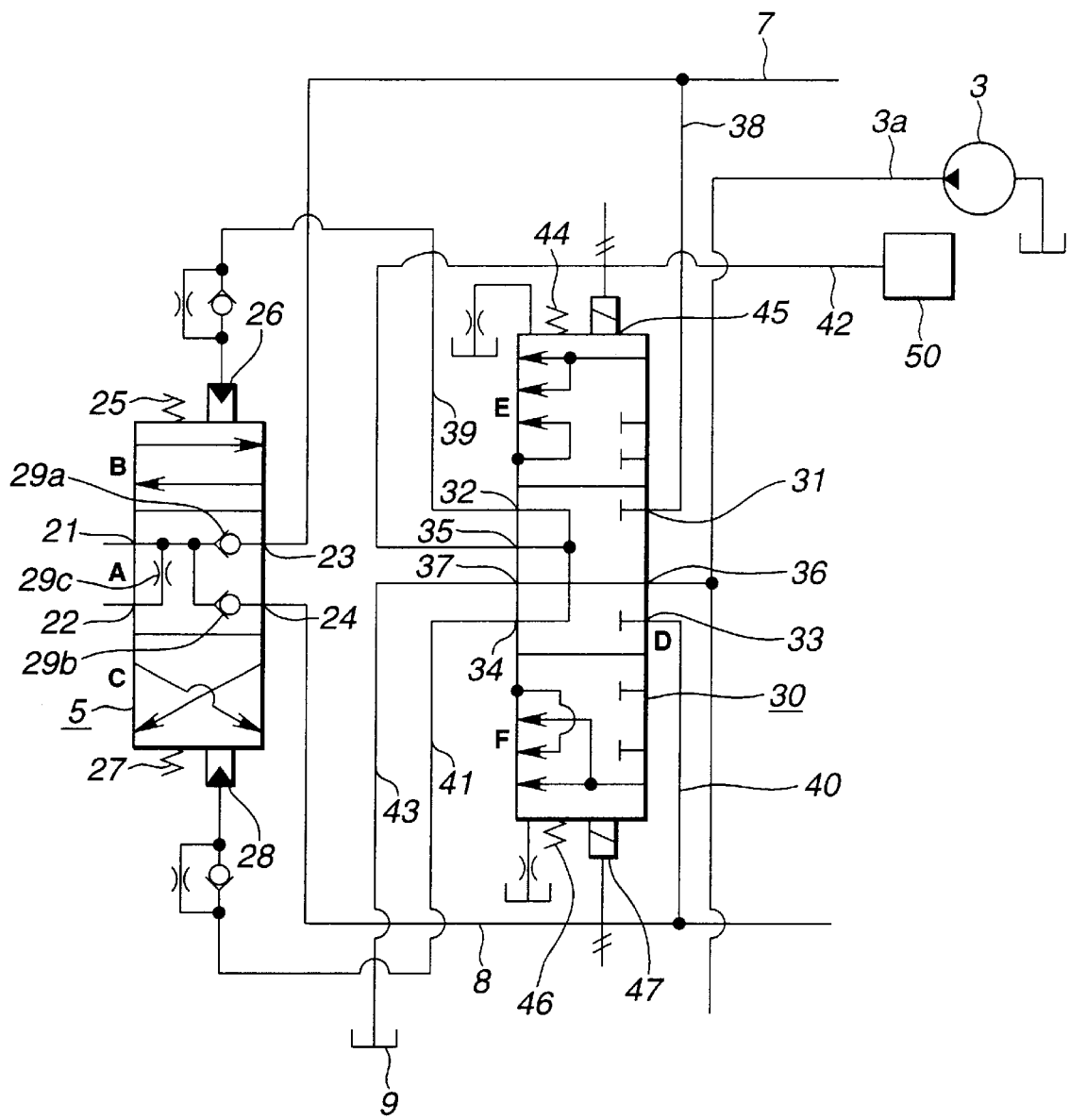
FIG. 2 is an enlarged diagram of the travel valve and pilot pressure supply valve noted in FIG. 1.
Figure 3:
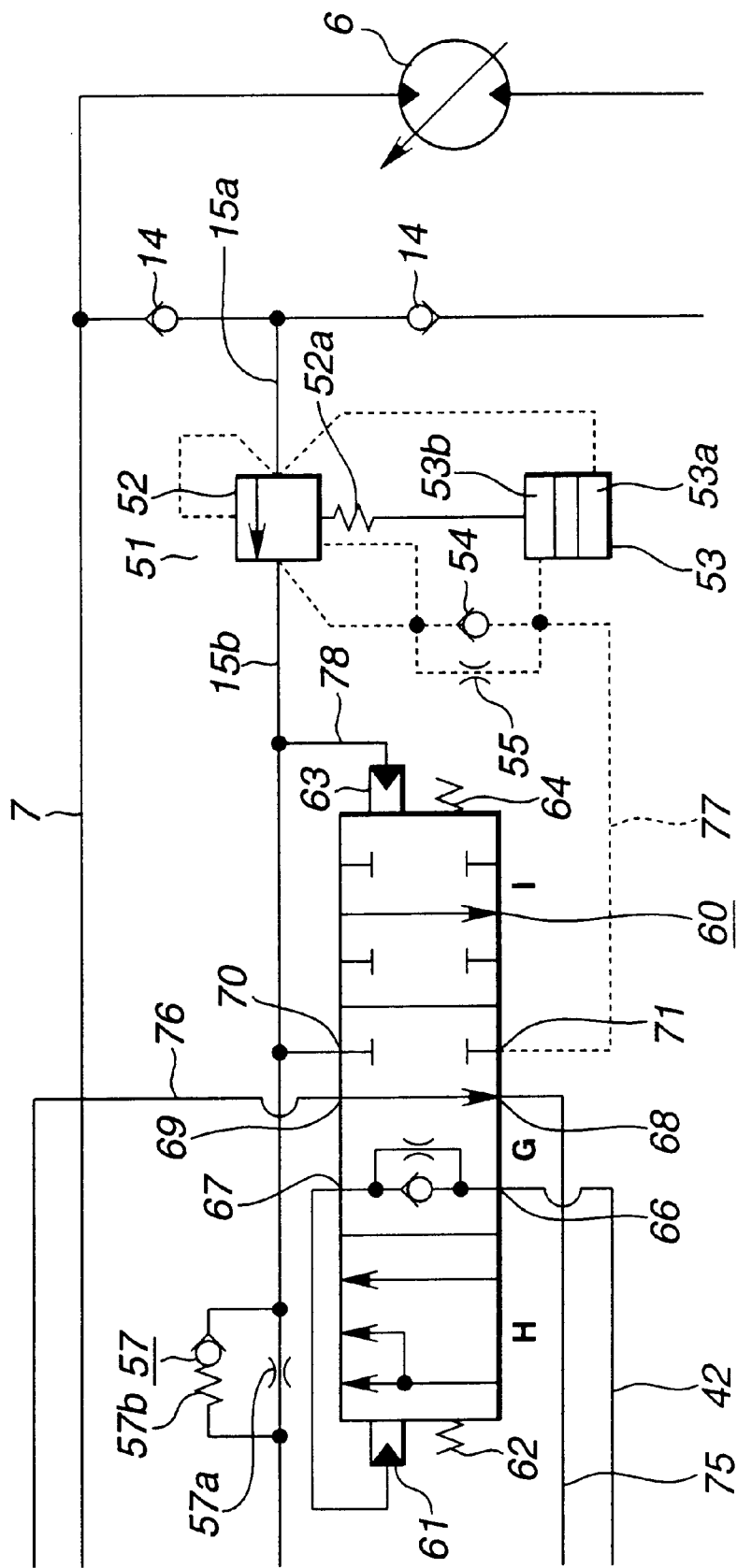
FIG. 3 is an enlarged diagram of the modulation relief valve noted in FIG. 1.
Figure 4:
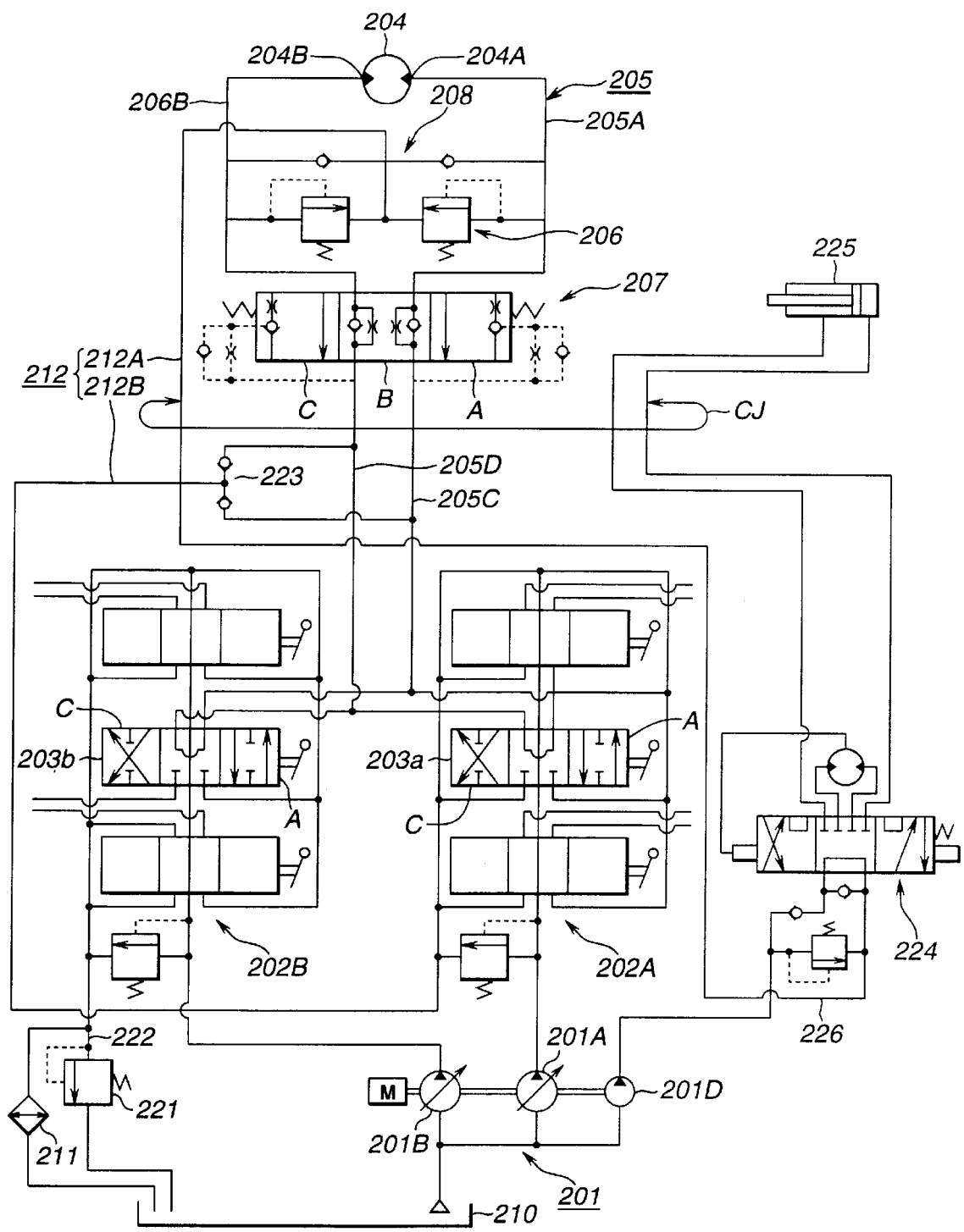
FIG. 4 is a hydraulic circuit diagram for a conventional travel hydraulic motor.

Embodiments of the present invention are now described, making reference to the drawings. FIG. 1; is a hydraulic circuit diagram representing an embodiment of a travel drive apparatus for hydraulic drive work vehicles according to the present invention; FIG. 2 is an enlarged diagram of the travel valve and pilot pressure supply valve noted in FIG. 1; and FIG. 3 is an enlarged diagram. of the modulation relief valve noted in FIG. 1.

As diagrammed in FIG. 1, an engine 1 drives a travel variable delivery hydraulic pump 2 and a fixed capacity type hydraulic control pump 3. The discharge line 2a from the travel hydraulic pump 2 is connected to a travel valve 5. To the travel valve 5 are connected a first main circuit 7 and a second main circuit 8 leading to the travel hydraulic motor, and a return circuit 11 leading to a tank 9. The travel valve 5 switches the pressure oil from the travel hydraulic pump 2 to either the first main circuit 7 or the second main circuit 8 going to the travel hydraulic motor 6, and returns the return oil from the travel hydraulic motor 6 to the tank 9. To the first main circuit 7 and second main circuit 8, respectively, are connected intake valves 12 and 12. These intake valves 12 and 12 are connected, respectively, to a return circuit 11 going to the tank 9 by an intake circuit 13. The intake valves 12 supply oil to either the first main circuit 7 or the second main circuit 8 when either the first main circuit 7 or second main circuit 8 falls below a prescribed pressure, thus preventing the occurrence of cavitation in the oil supplied to the travel hydraulic motor 6.

To the first main circuit 7 and the second main circuit 8, respectively, are connected check valves 14 and 14 acting as relief valves, and, via a relief circuit 15a, a modulation relief valve 50. A return relief circuit 15b for the modulation relief valve 50 passes through the intake circuit 13 and is connected to the return circuit 11 going to the tank 9. The modulation relief valve 50 is activated when either the first main circuit 7 or the second main circuit 8 reaches or exceeds a prescribed pressure, regulating the circuit pressure and applying a brake to the vehicle. The return oil from the modulation relief valve 50, moreover, passes through the intake circuit 13 and is supplied either to the first main circuit 7 or the second main circuit 8 by the intake valves 12 and 12.

A back-pressure valve 17 is inserted in the return circuit 11 going to the tank 9. As necessary, the pressure is raised on the oil returning to the tank 9 from the travel valve 5, intake circuit 13, or return relief circuit 15b and supplied from the intake valves 12 and 12 to either the first main circuit 7 or the second main circuit 8, wherefore the oil volume is increased and cavitation is prevented.

An oil line splitting off from the discharge line 3a from the hydraulic control pump 3 communicates with the tank 9 via a variable restrictor 18, so as to generate pressure in response to the discharge quantity from the hydraulic control pump 3, that is, pressure produced by the turning speed of the engine 1.

As diagrammed in FIG. 2, the travel valve 5 comprises four ports, namely a pump port 21, tank port 22, and first and second actuator ports 23 and 24. To the pump port 21 is connected the discharge line 2a from the travel variable delivery hydraulic pump 2. To the tank port 22 is connected the tank 9. To the first actuator port 23 is connected the first main circuit 7. And to the second actuator port 24 is connected the second main circuit 8.

The travel valve 5 is provided on one end with a first spring 25 and a first pressure unit 26, and on the other end with a second spring 27 and a second pressure unit 28. The travel valve 5 is made in a pilot pressure switching configuration wherein it is held in a neutral position A by the first and second springs 25 and 27, switched to a forward position B by the pressure in the first pressure unit 26, and switched to a reverse position C by the pressure in the second pressure unit 28. The neutral position A of the travel valve 5 is provided with first and second check valves 29a and 29b and with a restrictor 29c, the first check valve 29a being located between the pump port 21 and the first main circuit 7, and the second check valve 29b being located between the pump port 21 and the second main circuit 8. The first and second check valves 29a and 29b are provided so as to block flows both from the pump port 21 toward the first and second actuators 23 and 24, and from the first and second actuators 23 and 24 toward the pump port 21. The restrictor 29c is positioned between the pump port 21 and the tank port 22 to restrict flow to the tank 9 so as to prevent the pressure in the first main circuit 7 and second main circuit 8 going to the travel hydraulic motor 6 from falling below a prescribed pressure (from becoming a negative pressure, for example). To the first and second pressure units 26 and 28 of the travel valve 5 is supplied, as pilot pressure, the pressure in the first and second main circuits 7 and 8, via a pilot pressure supply valve 30 (described below).

The pilot pressure supply valve 30 comprises seven ports, namely first, second, third, fourth, fifth and sixth ports 31, 32, 33, 34, 35 and 36, and a tank port 37. The first port 31 is connected to the first main circuit 7 by a first pilot circuit 38, the second port 32 is connected to the first pressure unit 26 by a second pilot circuit 39, the third port 33 is connected to the second main circuit 8 by a third pilot circuit 40, and the fourth port 34 is connected to the second pressure unit 28 by a fourth pilot circuit 41. The fifth port 35 is connected to the modulation relief valve 50 by a fifth pilot circuit 42. The sixth port 36 is connected to the pressure control pump 3 via the discharge line 3a. The tank port 37 is connected to the tank 9 by a second return circuit 43.

The pilot pressure supply valve 30 has three positions, namely a neutral position D, a forward position E, and a reverse position F. The pilot pressure supply valve 30 is provided at one end with a first spring 44 and a first solenoid 45, and at the other end with a second spring 46 and a second solenoid 47. The pilot pressure supply valve 30 has an electromagnetic switching configuration wherewith it is maintained in the neutral position D by the first spring 44 and second spring 46, moved to the forward position E by the first solenoid 45, and moved to the reverse position F by the second solenoid 47. Current is supplied to the first solenoid 45 and the second solenoid 47 by manipulating a control unit 48 (described below).

In the neutral position D, the first port 31 and third port 33 are closed off, while the other ports (i.e. the second port 32, fourth port 34, fifth port 35, sixth port 36, and tank port 37) are all connected, and the discharge oil from the hydraulic control pump 3 has back pressure applied to it by a back-pressure check valve 49 (cf. FIG. 1) in front of the tank 9.

In the forward position E, the third port 33 and sixth port 36 are closed off, while either the first port 31, second port 32, and fifth port 35, or the fourth port 34 and tank port 37, respectively, are connected. When activated, the pressure in the first main circuit 7 is supplied to the first pressure unit 26 in the travel valve 5, while-the oil in the second pressure unit 28 is returned to the tank 9.

In the reverse position F, the first port 31 and sixth port 36 are closed off, while the third port 33, fourth port 34, and fifth port 35, or the second port 32 and tank port 37, respectively, are connected. When activated, the pressure in the second main circuit 8 is supplied to the second pressure unit 28 in the travel valve 5, while the oil in the first pressure unit 26 is returned to the tank 9.

The control unit 48 (cf. FIG. 1) is used when selecting either forward travel or reverse travel. When selecting forward travel, for example, the control unit 48 is manipulated to the right in the figure (FIG. 1), sending current to the first solenoid 45 and changing the pilot pressure supply valve 30 to the forward position E. The pilot pressure supply valve 30 supplies the pressure in the first main circuit 7 to the first pressure unit 26 in the travel valve 5, as a pilot pressure, switching the travel valve 5 to the forward position B. The pressure in the travel hydraulic pump 2 is supplied via the travel valve 5 in the forward position B, and the first main circuit 7, to the travel hydraulic motor 6, turning the motor so as to drive the vehicle forward. When selecting reverse travel, the procedure is the opposite. That is, the control unit 48 is manipulated to the left, as diagrammed, current is sent to the second solenoid 49, and the pilot pressure supply valve 30 is switched over to the reverse position F.

As diagrammed in FIG. 1, the modulation relief valve 50 comprises a variable relief valve 51, a control valve 60, and a restrictor unit 57.

The variable relief valve 51, as diagrammed in FIG. 1 and FIG. 3, comprises a variable relief valve 52, a piston unit 53, a check valve 54, and a restrictor 55.

The variable relief valve 52 is connected to the first main circuit 7 and the second main circuit 8 via the check valves 14 and 14, acting as relief valves, and the relief circuit 15a, and is also connected to the return circuit 11 going to the tank 9 via the return relief circuit 15b and the intake circuit 13. The pressure in the relief circuit 15a is led to and acts on one end of the variable relief valve 52, while the pressure in the return relief circuit 15b is led to and acts on the other end, which is also provided with a spring 52a. The piston unit 53 is linked to the spring 52a, and the force of this piston unit 53 acts on the spring 52a. Thus the load of the spring 52a acting on the other end of the variable relief valve 52 can be made variable, and the regulating pressure at the variable relief valve 52 can be made variable. The pressure in the relief circuit 15a is led to and acts in a piston bottom chamber 53a in the piston unit 53, ant piston unit 53 compresses the spring 52a. The piston head chamber 53b of the piston unit 53 is connected via the check valve 54 and the restrictor 55 to the return relief circuit 15b.

the variable relief valve 52 is set up so that, when the vehicle is traveling normally, either the pressure developed in the first main circuit 7 or the pressure developed in the second main circuit 8 acts on one end of the variable relief valve 52 and in the piston bottom chamber 53a of the piston unit 53, so that the pressure produced in the first main circuit 7 or second main circuit 8 due to travel becomes at or lower than a prescribed regulated pressure ( say 420 kg/cm², for example). When the vehicle is being braked or decelerating, moreover, the variable relief valve 52 is set up such that the oil returning to the return relief circuit 15b from the piston head chamber 53b is restricted by the restrictor 55, raising the pressure thereof, so as to both retard and weaken the compression of the spring 52a by the piston unit 53, so that the pressure generated in either the first main circuit 7 or second main circuit 8 becomes a breaking pressure (for example, a pressure variable from 150 to 420 kg/cm²) that follows the inertial energy of the vehicle.

The control valve 60, as diagrammed in FIG. 1 and FIG. 3, is configured with three positions and six ports, provided at one end with a third pressure unit 61 and spring 62, and provided at the other end with a fourth pressure unit 63 and spring 64. The three positions are a neutral position G positionally determined by the springs 62 and 64, a travel position H for forward or reverse travel, and a relief position I for braking. A first port 66 is connected by the fifth pilot circuit 42 to the fifth port 35 of the pilot pressure supply valve 30. The second port 67 is connected to the third pressure unit 61. A third port 68 is connected by a sixth pilot circuit 75 to the intake circuit 13. A fourth port 69 is connected by a seventh pilot circuit 76 to a regulator 80 (described below) in the travel hydraulic pump 2. A fifth port 70 is connected to the return relief circuit 15b. The sixth port 71 is connected by an eighth pilot circuit 77 to the piston head chamber 53b. And the fourth pressure unit 63 is connected by an eighth pilot circuit 78 to the return relief circuit 15b.

The control valve 60 is connected by the fifth pilot circuit 42, via the pilot pressure supply valve 30, to either the first main circuit 7 or second main circuit 8, is switched to the travel position H during forward or reverse travel, sending the drive pressure in either the first main circuit 7 or second main circuit 8, while traveling, to the regulator 80 of the travel hydraulic pump 2, and controlling the discharge quantity Q of the travel hydraulic pump 2.

The control valve 60, furthermore, is in the relief position I when the vehicle is braking, cutting off the oil returning from the piston head chamber 53b to the return relief circuit 15b via the eighth pilot circuit 77 and the control valve 60. At this time, the oil returning from the piston head chamber 53b to the return relief circuit 15b is restricted by the restrictor 55 so that its pressure is raised, thereby both retarding and weakening the contraction of the spring 52a by the piston unit 53, and the pressure developed in the first main circuit 7 or second main circuit 8 becomes a checking pressure (for example, a pressure variable from 150 to 420 kg/cm$^2$) that follows the inertial energy of the vehicle. The restrictor unit 57 comprises a restrictor 57a and a check valve 57b. The restrictor unit 57 increases the resistance to the return oil flowing in the return relief circuit 15b, and generates a prescribed pressure (2 kg/cm$^2$, for example) by the check valve 57b. This prescribed pressure acts on the fourth pressure unit 63 from the eighth pilot circuit 78, and switches the control valve 60 to the relief position I when the variable relief valve 52 is activated.

As diagrammed in FIG. 1, a regulator 80 is attached to the travel hydraulic pump 2 to make the pump discharge volume (i.e., the discharge volume per revolution, in cc/rev) variable. This regulator 80 comprises a piston cylinder 81, a servo valve 82, a restrictor 83, and a check valve 84. The piston cylinder 81 is connected to an inclined plate (not shown), receives oil from the servo valve 82 for controlling the tilt angle, and makes the discharge volume of the pump variable. On the bottom side of the piston cylinder 81 a spring 85 is inserted to compress the piston 81a in order to increase both the tilt angle and the pump discharge volume. The pilot pressure (Pac) from either the first main circuit 7 or second main circuit 8 is received on the head side of the piston cylinder 81 via the control valve 60.

The servo valve 82 is configured with two positions and three ports. A first port 86 is connected to the seventh pilot circuit 76, and receives the pilot pressure (Pac) from either the first main circuit 7 or second main circuit 8 via the control valve 60. A second port 87 is connected to the second return circuit 43. A third port 88 is connected to the piston cylinder 81 via the restrictor 83 and check valve 84. The servo valve 82 is connected by a link 89 to the piston cylinder 81 and moves together therewith.

The servo valve 82 is provided at one end with a fifth pressure unit 90 and spring 91, and at the other end with a sixth pressure unit 92.

The fifth pressure unit 90 receives the pilot pressure (Pac) from the seventh pilot circuit 76 via the control valve 60. The sixth pressure unit 92 receives the pressure developed in response to the turning speed of the engine 1, via an oil line 93 branching off from the discharge line 3a of the hydraulic control pump 3.

The servo valve 82 is in the J position when, while traveling, the drive pressure is high in either the first main circuit 7 or second main circuit 8 that drives the travel hydraulic motor 6, moving the piston cylinder 81 to the right, as diagrammed, against the force of the spring 91, and reducing the discharge volume (cc/rev). When the drive pressure is low during travel, and the engine turning speed is high, the servo valve 82 is in the K position, moving the piston cylinder 81 to the left, as diagrammed, working with the spring 91, to increase the discharge volume (cc/rev). When the travel hydraulic motor 6 is driven backward by the inertial energy of the vehicle, the drive pressure during travel is low, and the turning speed of the engine 1 is also low, the servo valve 82 is in either the K or J position, the piston cylinder 81 is moved to the left, as diagrammed, by the spring 91, and the discharge volume (cc/rev) is increased so that cavitation does not occur.

The travel operation is next described. The control unit 48 is manipulated to run the work vehicle in the forward direction, for example, sending current to the first solenoid 45 of the pilot pressure supply valve 30, and thereby switching the pilot pressure supply valve 30 over to the forward position E. The pilot pressure supply valve 30 blocks the return to the tank 9 of oil from the discharge line 3a of the hydraulic control pump 3, whereupon the oil from the hydraulic control pump 3 returns to the tank 9 via the variable restrictor 18, producing a pressure responsive to the turning speed of the engine 1, detecting the turning speed of the engine one, and supplying that pressure to the sixth pressure unit 92 in the servo valve 82 of the travel hydraulic pump 2 via the oil line 93 branching off from the discharge line 3a of the hydraulic control pump 3. The pilot pressure supply valve 30 receives the pressure driving the travel hydraulic motor 6 at the first port 31 from the first main circuit 7 connecting the travel valve 5 and the travel hydraulic motor 6, via the first pilot circuit 38, and supplies the drive pressure from the first main circuit 7 to the third pressure unit 61 of the control valve 60, as the pilot pressure (Pac), via the first port 31 to the fifth port 35, the fifth pilot circuit 42, and the control valve 60, switching the control valve 60 over to the travel position H. The pilot pressure supply valve 30 also supplies pilot pressure to the first pressure unit 26 of the travel valve 5 from the first port 31 via the second port 32 and the second pilot circuit 39, while the pilot pressure of the second pressure unit 28 is returned to the tank 9 via the fourth pilot circuit 41 and the pilot pressure supply valve 30, whereupon the travel valve 5 is switched over to the forward position B. The control valve 60 receives the drive pressure from the first main circuit 7, via the fifth pilot circuit 42, in the first port 66, and supplies the drive pressure as a pilot pressure (Pac) to the fifth pressure unit 90 in the travel hydraulic pump 2 via the fourth port 69 and the seventh pilot circuit 76.

When the pilot pressure supply valve 30 is switched over to the forward position E, the prescribed pressure in the first main circuit 7 restricted by the restrictor 29c in the travel valve 5 moves the travel valve 5 to the forward position B and the control valve 60 to the travel position H, being supplied to the fifth pressure unit 90 in the servo valve 82 of the travel hydraulic pump 2, whereupon the pressure oil discharged from the travel hydraulic pump 2 is supplied to the first main circuit 7, and the oil in the second main circuit 8 flows to the tank 9, turning the travel hydraulic motor 6 in the forward direction. At this time, the drive pressure driving the travel hydraulic motor 6 is at high pressure in order to start traveling, wherefore the servo valve 82 of the travel hydraulic pump 2 is in the J position, and the drive pressure moves the piston cylinder 81 to the right, as diagrammed, against the spring 91, reducing the discharge volume (cc/rev). Accordingly, the work vehicle begins traveling at a slow speed without jolting. At this time, furthermore, the control valve 60 is slowly activated and switched over by the restriction in the neutral position and by the restrictor 83 of the regulator 80, so that travel can be started without jolting.

At this time, moreover, the control valve 60 is in the travel position H, wherefore the oil in the piston head chamber 53b returns to the return relief circuit 15b via the eighth pilot circuit 77 and the sixth port 71 and fifth port 70 in the control valve 60, so that the return from the piston head chamber 53b to the return relief circuit 15b is rapid. For this reason, the drive pressure in the first main circuit 7 acts through the relief circuit 15a on one end of the variable relief valve 52 and in the piston bottom chamber 53a in the pressure unit 53, rapidly activating the piston unit 43, and causing the pressure due to travel in the first main circuit 7 to become the designated regulated pressure (420 kg/cm² for example).

When next, to raise the speed of travel, the operator steps down on an accelerator pedal (not shown), the turning speed of the engine 1 rises, wherefore the discharge pressure of the hydraulic control pump 3 increases, and this high discharge pressure is supplied to the sixth pressure unit 92 of the servo valve 82 in the travel hydraulic pump 2. Meanwhile, when the travel speed increases, the drive pressure in the first main circuit 7 driving the travel hydraulic motor 6 decreases. This decreased drive pressure is supplied to the fifth pressure unit 90 of the servo valve 82 in the travel hydraulic pump 2 via the pilot pressure supply valve 30, control valve 60, and seventh pilot circuit 76. Thus the servo valve 82 passes the drive pressure from the seventh pilot circuit 76 through the K position to the bottom side of the piston cylinder 81 and moves the piston 81a together with the spring 91 to the left in diagrammed (FIG. 1) to increase the discharge volume (cc/rev). thereby increasing the speed of the vehicle. At this time, the high discharge pressure of the hydraulic control pump 3 acts on the back-pressure valve 17 to reduce the pressure on the oil returning from the travel hydraulic motor 6.

Next is described the case where the vehicle is decelerated while traveling at high speed. When the operator eases up on the accelerator pedal (not shown), the discharge pressure of the hydraulic control pump 3 decreases because the turning speed of the engine 1 decreases, and that decreased discharge pressure is supplied to the sixth pressure unit 92 of the servo valve 82 in the travel hydraulic pump 2. Because the work vehicle is traveling at high speed, moreover, the drive pressure driving it is also low. Nevertheless, in order to decelerate further, the travel hydraulic motor 6 receives a drive force opposite to the inertial energy of the vehicle, whereupon the drive pressure in the first main circuit 7 becomes a low pressure, and the pressure supplied to the fifth pressure unit 90 in the servo valve 82 also becomes lower. The servo valve 82, therefore, moves from the J position to the K position, and the oil on the bottom side of the piston cylinder 81 returns to the tank 9 via the restrictor 83 of the regulator 80 and the servo valve 82 in the K position. Thus the piston 81a is moved to the right as diagrammed (FIG. 1), reducing the discharge volume (cc/rev), but when it has moved a prescribed amount the piston 81a comes up against the spring 85 and stops, whereupon the discharge volume (cc/rev) of the travel hydraulic pump 2 is maintained at the prescribed value. The prescribed volume of oil discharged from this travel hydraulic pump 2 is sent via the discharge line 2a and the travel valve 5 in the forward position B to the first main circuit 7, thus maintaining the prescribed pressure (20 kg/cm², for example), whereupon cavitation is definitely prevented from occurring in the travel hydraulic motor 6. At this time, the oil returning to the tank 9 from the travel hydraulic motor 6 increases the oil volume supplied from the intake valve 12 to the first main circuit 7.

The case of traveling down a slope is next described.

When traveling down a slope, the inertial energy of the work vehicle increases, and the turning speed of the travel hydraulic motor 6 seeks to exceed a speed commensurate with the discharge quantity supplied from the travel hydraulic pump 2, that is to say, an overrun occurs, whereupon the pressure in the first main circuit 7 decreases. Accordingly, the pilot pressure acting from the first main circuit 7 on the first pressure unit 26 in the travel valve 5, via the first pilot circuit 38, the pilot pressure supply valve 30 in the forward position E, and the second pilot circuit 39, decreases.

The travel valve 5, therefore, is returned to the neutral position A from the forward position E by the first spring 25. When the travel valve 5 is returned to the neutral position A, the return oil discharged from the travel hydraulic motor 6 being driven by the inertial energy of the work vehicle is blocked from returning to the tank 9 by the second check valve 29b of the travel valve 5, and the pressure of the oil returning from the travel hydraulic motor 6 rises. Due to this rise in the pressure of the return oil of the travel hydraulic motor 6, a braking torque is produced which causes the turning speed of the travel hydraulic motor 6 to decelerate. Also, the pilot pressure that acts, from the first main circuit 7, on the third pressure unit 61 in the control valve 60, via the first pilot circuit 38, the pilot pressure supply valve 30 in the forward position E, the fifth pilot circuit 42, and the control valve 60 in the travel position H, is reduced. Therefore the control valve 60 is returned to the neutral position G from the forward position E by the spring 64.

The control valve 60 connects the seventh pilot circuit 76 connected to the servo valve 82 in the travel hydraulic pump 2 with the sixth pilot circuit 75 connected to the tank 9 via the intake circuit 13, and reduces the pilot pressure acting on the servo valve 82 in the travel hydraulic pump 2. The servo valve 82 is switched over to the K position by the discharge pressure of the hydraulic control pump 3 acting on the sixth pressure unit 92, and the oil on the bottom side of the piston cylinder 81 returns to the tank 9 via the restrictor 83 of the regulator 80 and the servo valve 82 in the K position. Thus the piston 81a is moved to the right, as diagrammed (FIG. 1), reducing the discharge volume (cc/rev), but when it moves a prescribed amount the piston 81a comes up against the spring 85 and stops, whereupon the discharge volume (cc/rev) of the travel hydraulic pump 2 is maintained at the prescribed value.

This prescribed volume of oil discharged from the travel hydraulic pump 2 is sent via the discharge line 2a and the first check valve 29a of the travel valve 5 in the neutral position A to the first main circuit 7, and the prescribed pressure (20 kg/cm², for example) is maintained, while the oil returning to the tank 9 from the travel hydraulic motor 6 increases the oil volume supplied from the intake valve 12 to the first main circuit 7.

As a result of all this, the work vehicle will be braked, and overrun in the work vehicle will be prevented. When the work vehicle is braked and its speed decreases, the pressure in the first main circuit 7 will again rise, the travel hydraulic motor 6 will be balanced at a speed commensurate with the discharge quantity supplied from the travel hydraulic pump 2, and the work vehicle will travel down the slope.

Next will be described the case of the work vehicle being stopped from a traveling state.

The operator eases up on the accelerator pedal (not shown) and at the same time manipulates the control unit 48 from the forward position to the neutral position.

The turning speed of the engine 1 decreases, wherefore the discharge pressure of the hydraulic control pump 3 also decreases, and this lowered discharge pressure is supplied to the sixth pressure unit 92 of the servo valve 82 in the travel hydraulic pump 2. Due to the manipulation of the control unit 48, the current that had been flowing to the first solenoid 45 stops, and the pilot pressure supply valve 30 returns to the neutral position D from the forward position E. As a result, the pressure driving the travel hydraulic motor 6 supplied to the first port 31 from the first main circuit 7 via the first pilot circuit 38 is shut off by the first port 31.

Also, the supply of the pilot pressure (Pac) from the first main circuit 7 that had been acting on the third pressure unit 61 in the control valve 60 via the first port 31 is stopped, and the control valve 60 is returned to the neutral position G from the travel position H. Also, the supply of the pilot pressure to the first pressure unit 26 in the travel valve 5 via the first port 31 is stopped, and the travel valve 5 is returned to the neutral position A from the forward position B.

At this time, when the inertial energy of the work vehicle is large due to the cargo being carried, etc., the travel hydraulic motor will be subjected to the large opposite drive force associated with the inertial energy of the vehicle. The return oil in the second main circuit 8 discharged from the travel hydraulic motor 6 driven by the inertial energy of the work vehicle is prevented from returning to the tank 9 by the second check valve 29b in the travel valve 5, and the pressure on the oil returning from the travel hydraulic motor 6 rises. Due to the rise in pressure on the return oil of the travel hydraulic motor 6, a braking torque is developed which acts to slow down the turning speed of the travel hydraulic motor 6. This braking torque is generated by the pressure that is produced by the variable relief valve 52 when the return oil from the second main circuit 8 acts thereon via the check valve 14 acting as a relief valve. This pressure that is produced is determined by the size of the opposite drive force associated with the inertial energy of the vehicle.

In other words, since the control valve 60 is in the neutral position G, the oil returning to the return relief valve 15b from the piston head chamber 53b via the eighth pilot circuit 77 and the control valve 60 is shut off. At this time, the oil returning to the return relief circuit 15b from the piston head chamber 53b has its pressure raised by the restriction of the restrictor 55, the compression of the spring 52a by the piston unit 53 is retarded and weakened, and the pressure generated in the second main circuit 8 is adjusted by the variable relief valve 52 so that it becomes a braking pressure (a pressure variable from 150 to 420 kg/cm$^2$, for example) that follows the inertial energy of the vehicle. The pressure oil in this relief circuit 15a, after adjustment, flows to the return relief circuit 15b, and is supplied to the first main circuit 7 from the intake valve 12 via the intake circuit 13.

Also, because the control valve 60 is in the neutral position G, the discharge quantity of the travel hydraulic pump 2 acts in the same manner as when the vehicle is traveling down a slope, as described earlier.

The control valve 60 connects the seventh pilot circuit 76 connected to the servo valve 82 of the travel hydraulic pump 2 with the sixth pilot circuit 75 connected to the tank 9 via the intake circuit 13, and lowers the pilot pressure acting on the servo valve 82 of the travel hydraulic pump 2. The servo valve 82 is switched over to the K position by the discharge pressure of the hydraulic control pump 3 acting on the sixth pressure unit 92, and the oil on the bottom side of the piston cylinder 81 returns to the tank 9 via the restrictor 83 in the regulator 80 and the servo valve 82 in the K position. Therefore the piston 81a is moved to the right, as diagrammed, reducing the discharge volume (cc/rev). When it has moved the prescribed amount, the piston 81a comes up against the spring 85 and stops, and the discharge volume (cc/rev) of the travel hydraulic pump 2 is maintained at the prescribed value. The oil discharged from this travel hydraulic pump 2 in the prescribed volume is sent to the first main circuit 7 via the discharge line 2a and the first check valve 29a of the travel valve 5 in the neutral position A and kept at a prescribed pressure (20 kg/cm$^2$, for example), wherefore cavitation is definitely prevented from occurring in the travel hydraulic motor 6. At this time, the oil returning to the tank 9 from the travel hydraulic motor 6 increases the oil volume supplied from the intake valve 12 to the first main circuit 7.

As a result of these operations, the work vehicle is braked, and the work vehicle can be stopped in a prescribed braking distance by a braking pressure that follows the inertial energy of the vehicle.

Next is described the case of changing the work vehicle from traveling forward to traveling in reverse.

The operator eases up on the accelerator pedal (not shown) and, at the same time, manipulates the control unit 48 from the forward position to the reverse position. The turning speed of the engine 1 decreases, so the discharge pressure of the hydraulic control pump 3 also decreases. This lowered discharge pressure is supplied to the sixth pressure unit 92 in the servo valve 82 of the travel hydraulic pump 2. The current that is flowing in the first solenoid 45 is stopped by the manipulation of the control unit 48, and, at the same time, current begins flowing in the second solenoid 47, and the pilot pressure supply valve 30 is switched over from the forward position E to the reverse position F. The pilot pressure supply valve 30 receives, at the third port 33, the pressure driving the travel hydraulic motor 6 from the second main circuit 8 connecting the travel valve 5 and the travel hydraulic motor 6, and, from the third port 33, supplies the drive pressure from the second main circuit 8 as a pilot pressure (Pac) to the third pressure unit 61 in the control valve 60, via the fifth port 35, the fifth pilot circuit 42, and the control valve 60, switching the control valve 60 to the travel position H. Also, the pilot pressure supply valve 30 supplies pilot pressure from the third port 33 to the second pressure unit 28 in the travel valve 5, via the fourth port 34 and the fourth pilot circuit 41. The pilot pressure of the first pressure unit 26 is returned to the tank 9 via the second pilot circuit 39 and the pilot pressure supply valve 30, switching the travel valve 5 over to the reverse position C. The control valve 60 receives the drive pressure from the second main circuit 8 at the first port 66, via the fifth pilot circuit 42, and supplies the drive pressure as a pilot pressure (Pac) via the fourth port 69 and seventh pilot circuit 76 to the fifth pressure unit 90 in the servo valve 82 of the travel hydraulic pump 2.

The pilot pressure supply valve 30 is moved to the reverse position F, the travel valve 5 to the reverse position C, and the control valve 60 to the travel position H, so that the drive pressure is supplied to the fifth pressure unit 90 in the servo valve 82 of the travel hydraulic pump 2. Whereby, the travel hydraulic pump 2 is activated and the discharge pressure oil from the travel hydraulic pump 2 is supplied to the second main circuit 8 and, at the same time, the oil in the first main circuit 7 flows to the tank 9 and turns the travel hydraulic motor 6 in the reverse position. However, by the changeover at reverse travel time, the pressure oil for reverse travel is supplied to the second main circuit 8 in which return oil is flowing during forward travel. At this time, the work vehicle is not stopped, so the travel hydraulic motor 6 is subjected to the opposite drive force associated with the inertial energy of the vehicle, the drive pressure in the first main circuit 7 becomes a low pressure, and a high pressure is developed in the second main circuit 8 due to the merging of the pressure oil for reverse travel from the travel hydraulic pump 2 and the return oil carrying the opposite drive force of the travel hydraulic motor 6.

The high pressure generated in the second main circuit 8 acts on the variable relief valve 52 via the check valve 14 acting as a relief valve, the variable relief valve 52 is activated by the high pressure so generated, the R.P.M. in the forward direction is gradually reduced, and the vehicle is stopped. When the variable relief valve 52 is activated and the oil, after adjustment, flows into the return relief circuit 15b, it is restricted by the restrictor unit 57, producing the prescribed pressure, which acts on the fourth pressure unit 63 from the eighth pilot circuit 78, and the control valve 60 is switched over to the relief position I when the variable relief valve 52 is activated.

As a result of this changeover, the control valve 60 is in the relief position I, so the oil returning from the piston head chamber 53b to the return relief circuit 15b via the eighth pilot circuit 77 and the control valve 60 is shut off. At this time, the oil returning from the piston head chamber 53b to the return relief circuit 15b has its pressure raised by the restriction of the restrictor 55, whereupon the compression of the spring 52a by the piston unit 53 is retarded and weakened, and the pressure produced in the second main circuit 8 is regulated by the variable relief valve 52 so that it becomes a braking pressure (a pressure variable from 150 to 420 kg/cm$^2$, for example) that follows the inertial energy of the vehicle. The pressure oil in this relief circuit 15a, after adjustment, flows into the return relief circuit 15b, and is supplied to the first main circuit 7 from the intake valve 12 via the intake circuit 13. When the control valve 60 is in the relief position I, the seventh pilot circuit 76 connecting to the servo valve 82 in the travel hydraulic pump 2 is connected with the sixth pilot circuit 75 connecting to the tank 9 via the intake circuit 13, whereupon the pilot pressure acting on the servo valve 82 of the travel hydraulic pump 2 is reduced.

The servo valve 82 is switched over to the K position by the discharge pressure of the hydraulic control pump 3 acting on the sixth pressure unit 92, and the oil on the bottom side of the piston cylinder 81 returns to the tank 9 via the restrictor 83 of the regulator 80 and the servo valve 82 in the K position. The piston 81a is thereby moved to the right, as diagrammed (FIG. 1), reducing the discharge volume (cc/rev). When it moves a prescribed amount, the piston 81a comes up against the spring 85 and stops, and the discharge volume (cc/rev) of the travel hydraulic pump 2 is maintained at the prescribed value. This oil discharged from the travel hydraulic pump 2 in the prescribed volume is sent to the second main circuit 8 via the discharge line 2a and the second check valve 29b of the travel valve 5 in the reverse position C. In the second main circuit 8, the oil discharged in the prescribed volume from the travel hydraulic pump 2 in the prescribed volume, which merges with the return oil acted on by the opposite drive force of the travel hydraulic motor 6, increases, the volume of oil flowing from the relief circuit 15a into the return relief circuit 15b, adjusted by the variable relief valve 52, increases, and an increased oil volume is supplied from the intake valve 12 via the intake circuit 13 to the first main circuit 7, whereupon cavitation no longer occurs in the first main circuit 7.

This regulation in the second main circuit 8, and the supplying of return oil to the first main circuit 7, are conducted during the time interval up until the work vehicle stops. When the work vehicle stops, the regulation by the variable relief valve 52 stops, and there ceases to be any oil volume flowing into the return relief circuit 15b. Therefore the prescribed pressure acting on the fourth pressure unit 63 disappears, and the control valve 60 returns to the neutral position G. After this, the control valve 60 supplies, as pilot pressures, the pressure driving the travel hydraulic motor 6, from the second main circuit 8 connecting the travel valve 5 and the travel hydraulic motor 6 to the third port 33, via the third pilot circuit 40, to the third port 33, and the drive pressure from the second main circuit 8, from the third port 33 in the pilot pressure supply valve 30, via the fifth port 35 and the fifth pilot circuit 42, to the third pressure unit 61, switching the control valve 60 over to the travel position H.

The control valve 60 receives at the first port 66 the drive pressure from the second main circuit 8, via the fifth pilot circuit 42, and supplies this drive pressure as a pilot pressure (Pac) to the fifth pressure unit 90 in the servo valve 82 of the travel hydraulic pump 2, via the fourth port 69 and the seventh pilot circuit 76. At this time, the drive pressure driving the travel hydraulic motor 6 is at high pressure in order to start the vehicle traveling in reverse, from a forward traveling condition, wherefore the servo valve 82 of the travel hydraulic pump 2 is in the J position, and the drive pressure moves the piston cylinder 81 to the right, as diagrammed, against the spring 91, thus reducing the discharge volume (cc/rev).

Accordingly, the work vehicle will begin traveling at a slow speed without jolting. At this time, furthermore, the control valve 60 is activated and switched over slowly by the restriction in the neutral position and the restrictor 83 in the regulator 80, wherefore travel in reverse can be started without jolting.

At this time, moreover, the control valve 60 is in the travel position H, so the oil in the piston head chamber 53b returns to the return relief circuit 15b via the eighth pilot circuit 77 and the sixth port 71 and fifth port 70 of the control valve 60, wherefore it returns rapidly from the piston head chamber 53b to the return relief circuit 15b. For this reason, the drive pressure of the first main circuit 7 acts on one end of the variable relief valve 52 and in the piston bottom chamber 53a of the piston unit 53, via the relief circuit 15a, whereupon the piston unit 53 is rapidly activated, so that the pressure resulting from travel in the first main circuit 7 becomes the prescribed adjusted pressure (420 kg/cm$^2$, for example).

As a result, the oil volume supplied to the travel hydraulic motor 6 from the travel hydraulic pump 2 is maintained at the prescribed volume by the spring 85 provided in the regulator 80, wherefore, even manipulated back and forth from forward to reverse or from reverse to forward, the oil volume supplied to the travel hydraulic motor 6 increases, and the occurrence of cavitation ceases. Thus the back-and-forth manipulation that is very difficult with open circuit hydraulic drives conventionally becomes possible, and damage to the hydraulic equipment can be prevented. Also, while using the variable relief valve 52, the braking pressure and braking time thereof are made so as to follow the inertial energy of the vehicle, wherefore the braking distance can be made roughly constant irrespective of the vehicle speed.

The variable relief valve 52 is made such that, when the vehicle is braking or decelerating, the oil returning from the piston head chamber 53b to the return relief circuit 15b is restricted by the restrictor 55, raising the pressure, so that the compression on the spring 52a by the piston unit 53 is retarded and weakened, and the pressure generated in either the first main circuit 7 or second main circuit 8 becomes a brake pressure (a pressure variable from 150 to 420 kg/cm$^2$, for example) that follows the inertial energy of the vehicle, wherefore the direction of travel can be changed without jolting. The servo valve 82 in the travel hydraulic pump 2 moves the piston cylinder 81 to the right, as diagrammed (FIG. 1), against the spring 91, thus reducing the discharge volume (cc/rev), so that the work vehicle begins to travel at a slow speed without jolting. At this time, furthermore, the control valve 60 is activated and switched over slowly by the restriction in the neutral position and the restrictor 83 in the regulator 80, whereupon travel is commenced without jolting.

As explained in the foregoing, the hydraulic pressure going to the regulator that controls the discharge quantity of the travel hydraulic pump 2 is received via either the first main circuit 7 or second main circuit 8 connecting the travel valve 5 and the travel hydraulic motor 6, wherefore the discharge quantity of the hydraulic pump is no longer reduced, even when the discharge pressure of the travel hydraulic pump 2 is high, whereupon cavitation ceases to be produced in the travel hydraulic motor 6. Furthermore, when the oil pressure driving the travel hydraulic motor 6 is below the prescribed value, because of the spring that is provided for securing the prescribed discharge quantity in the regulator of the hydraulic pump, cavitation is no longer produced in the travel hydraulic motor 6, even when the vehicle is acted on by an opposite drive force.

By employing a variable relief valve 52 for generating a brake pressure to follow the inertial energy of the vehicle, the braking distance can be made roughly constant, irrespective of vehicle speed, and work vehicle jolting can be eliminated even when the vehicle is braking or decelerating.

What is claimed is:

1. A travel drive apparatus for a hydraulic drive work vehicle including a travel variable delivery hydraulic pump driven by power from an engine; a fixed capacity hydraulic pump which discharges pressure oil corresponding to an engine turning speed; a hydraulic motor that receives oil discharged from the variable delivery hydraulic pump and moves a vehicle at or below a prescribed speed; and a travel changeover valve that receives the discharged oil from the variable delivery hydraulic pump, supplies the discharged oil to the hydraulic motor, and discharges return oil from the hydraulic motor to a tank, the apparatus comprising:

a horsepower control mechanism that is linked to the variable delivery hydraulic pump and activated by receiving pressure oil discharged from the variable delivery hydraulic pump and supplied to the hydraulic motor and pressure oil discharged from the fixed capacity hydraulic pump, the horsepower control mechanism being configured to control the variable delivery hydraulic pump such that, when the engine turning speed is at or below a prescribed value and the hydraulic motor is driven by inertial energy of the vehicle, a flow rate of the pressure oil supplied to the hydraulic motor reaches or exceeds a prescribed value.

2. The travel drive apparatus for a hydraulic drive work vehicle according to claim 1, wherein the horsepower control mechanism comprises:

a piston cylinder having a piston coupled to the variable delivery hydraulic pump and a spring which, when the piston receives at one other end thereof the pressure oil supplied to the hydraulic motor and moves to the other end thereof, maintains the flow rate of the pressure oil supplied to the hydraulic motor by abutting against the other end of the piston; and a servo valve that is activated by receiving the pressure oil supplied to the hydraulic motor and the discharged oil from the fixed capacity hydraulic pump and that changes supply and discharge, to and from the other end of the piston, of the pressure oil supplied to the hydraulic motor.

3. For a travel drive apparatus for a hydraulic drive work vehicle including a travel variable delivery hydraulic pump driven by power from an engine, a fixed capacity hydraulic pump which discharges pressure oil corresponding to an engine turning speed, a hydraulic motor that receives oil discharged from the variable delivery hydraulic pump and moves a vehicle at or below a prescribed speed, and a travel changeover valve that receives the discharged oil from the variable delivery hydraulic pump, supplies the discharged oil to the hydraulic motor and discharges return oil from the hydraulic motor to a tank, a control method comprising the steps of:

a) receiving the pressure oil supplied to the hydraulic motor and the pressure oil discharged from the fixed capacity hydraulic pump when the engine turning speed is at or below a prescribed value and the hydraulic motor is driven by inertial energy of a vehicle; and b) controlling the variable delivery hydraulic pump so that a flow rate of the pressure oil supplied to the hydraulic motor reaches or exceeds a prescribed value.

* * * * *